US011007995B2

(12) United States Patent
Quix et al.

(10) Patent No.: US 11,007,995 B2
(45) Date of Patent: May 18, 2021

(54) METHODS AND SYSTEMS FOR THERMAL MANAGEMENT OF A VEHICLE

(71) Applicant: Ford Global Technologies, LLC, Dearborn, MI (US)

(72) Inventors: Hans Guenter Quix, Herzogenrath (DE); Robert Hoenen, Wuerselen (DE); Christian Hans, Hergenrath (BE); Herbert Ernst, Kerkrade (NL); Antonio Farina, Uebach-Palenberg (DE)

(73) Assignee: Ford Global Technologies, LLC, Dearborn, MI (US)

( * ) Notice: Subject to any disclaimer, the term of this patent is extended or adjusted under 35 U.S.C. 154(b) by 125 days.

(21) Appl. No.: 15/894,470

(22) Filed: Feb. 12, 2018

(65) Prior Publication Data

US 2018/0236997 A1 Aug. 23, 2018

(30) Foreign Application Priority Data

Feb. 20, 2017 (DE) .......................... 102017202638.3

(51) Int. Cl.
*B60W 20/15* (2016.01)
*B60W 50/00* (2006.01)
(Continued)

(52) U.S. Cl.
CPC ............ *B60W 20/15* (2016.01); *B60W 10/04* (2013.01); *B60W 20/12* (2016.01); *B60W 40/12* (2013.01); *B60W 50/0097* (2013.01); *B60W 50/085* (2013.01); *B60W 50/14* (2013.01); *B60W 2050/0063* (2013.01);
(Continued)

(58) Field of Classification Search
None
See application file for complete search history.

(56) References Cited

U.S. PATENT DOCUMENTS 5,467,277 A   11/1995  Fujisawa et al.
7,128,026 B2  10/2006  Braun et al.
(Continued)

FOREIGN PATENT DOCUMENTS

DE        10228355 A1   1/2004
DE    102010053747 A1   6/2012
(Continued)

OTHER PUBLICATIONS

Stocker, M. et al., "Thermal Management for Energy—Efficient Improvement of Automobile Cooling Systems Based on Navigation Data," Proceedings of the 25th Aachen Colloquium Automobile and Engine Technology Conference 2016, Oct. 10, 2016, Aachen, Germany, 18 pages.

*Primary Examiner* — David P. Merlino
(74) *Attorney, Agent, or Firm* — Geoffrey Brumbaugh; McCoy Russell LLP

(57) ABSTRACT

Methods and systems are provided for estimating a drive train temperature for a journey. In one example, a method comprises requesting a vehicle operator to input one or more travel parameters for the journey, predicting travel parameters the vehicle operator omitted to input, and displaying an estimated fuel economy for the journey, where the estimated fuel economy is based on the estimated drive train temperature, which is based on the travel parameters.

8 Claims, 5 Drawing Sheets

(51) Int. Cl.
    *B60W 50/08*  (2020.01)
    *B60W 20/12*  (2016.01)
    *B60W 10/04*  (2006.01)
    *B60W 40/12*  (2012.01)
    *B60W 50/14*  (2020.01)

(52) U.S. Cl.
    CPC . *B60W 2050/146* (2013.01); *B60W 2510/305* (2013.01); *B60W 2530/10* (2013.01); *B60W 2540/215* (2020.02); *B60W 2540/30* (2013.01); *B60W 2554/00* (2020.02); *B60W 2556/50* (2020.02); *B60W 2710/0688* (2013.01); *B60W 2710/088* (2013.01); *B60W 2710/1072* (2013.01); *B60W 2710/246* (2013.01); *Y02T 10/40* (2013.01); *Y02T 10/84* (2013.01); *Y10S 903/93* (2013.01)

(56) References Cited

U.S. PATENT DOCUMENTS

| | | | |
|---|---|---|---|
| 7,334,545 B2 | 2/2008 | Muller | |
| 7,347,168 B2 | 3/2008 | Reckels et al. | |
| 7,925,426 B2 | 4/2011 | Koebler et al. | |
| 2006/0196451 A1 | 9/2006 | Braun et al. | |
| 2006/0276287 A1* | 12/2006 | Lang | B60K 6/365 475/5 |
| 2007/0244616 A1* | 10/2007 | Roudeau | B60W 30/182 701/52 |
| 2008/0189018 A1* | 8/2008 | Lang | B60K 6/387 701/54 |
| 2010/0324765 A1* | 12/2010 | Iida | H01M 16/006 701/22 |
| 2011/0125357 A1* | 5/2011 | Harumoto | B60K 6/48 701/22 |
| 2012/0078496 A1* | 3/2012 | Lindhuber | B60K 35/00 701/123 |
| 2013/0225365 A1* | 8/2013 | Huth | B60T 10/02 477/59 |
| 2013/0261966 A1* | 10/2013 | Wang | G01C 21/3469 701/533 |
| 2014/0277971 A1* | 9/2014 | Oshiro | B60W 50/14 701/51 |
| 2015/0066236 A1* | 3/2015 | Gehring | G01C 21/3469 701/1 |
| 2015/0100188 A1* | 4/2015 | Wagner | B60L 58/10 701/22 |
| 2015/0307081 A1* | 10/2015 | West | B60W 10/115 701/22 |
| 2016/0363456 A1* | 12/2016 | Pujos | G08G 5/0017 |
| 2017/0101030 A1* | 4/2017 | Hughes | B60L 58/26 |
| 2017/0138473 A1* | 5/2017 | Fukao | F16H 61/66259 |
| 2017/0210203 A1 | 7/2017 | Quix et al. | |

FOREIGN PATENT DOCUMENTS

| | | |
|---|---|---|
| DE | 102013205223 A1 | 9/2014 |
| DE | 102013005707 A1 | 10/2014 |
| DE | 102013009912 A1 | 12/2014 |
| DE | 102013009913 A1 | 12/2014 |
| DE | 102013009914 A1 | 12/2014 |
| DE | 102014004817 A1 | 10/2015 |
| EP | 1034984 A2 | 9/2000 |
| EP | 2441944 A2 | 4/2012 |
| GB | 2467900 A | 8/2010 |
| WO | 2013143897 A1 | 10/2013 |
| WO | 2015108470 A1 | 7/2015 |

\* cited by examiner

METHODS AND SYSTEMS FOR THERMAL MANAGEMENT OF A VEHICLE

CROSS REFERENCE TO RELATED APPLICATION

This application claims priority to German Patent Application No. 102017202638.3, filed Feb. 20, 2017. The entire contents of the above-referenced application are hereby incorporated by reference in its entirety for all purposes.

FIELD

The present description relates generally to predictive thermal management of a vehicle.

BACKGROUND/SUMMARY

Demand based temperature regulation both for internal combustion engines and for electric drives or else for hybrid drives is an effective measure for reducing the consumption or the energy demand. Predictive thermal management is a strategy for adapting the system temperatures to the expected driving profile. In this context, the navigation data of the current driving route and the current traffic situation are taken into account. In addition, the possible destination input in the navigation system can also be used for more wide ranging pre-calculation of the driving route.

Examples of such predictive thermal management are described in the publication by Stocker, Metal, "Thermal Management for Energy—Efficient Improvement of Automobile Cooling Systems Based on Navigation Data", 25th Aachen Colloquium Automobile and Engine Technology 2016, pages 437-454.

Additionally previous examples include DE 103 36 599 A1, DE 10 2013 009 912 A1 and DE 10 2013 009 913 A1. In this context, DE 103 36 599 A1 describes a control algorithm which permits the coolant temperature to be regulated to three different temperature levels using the ambient temperature. Furthermore, a characterizing feature is used for classifying the driver type. DE 10 2013 009 912 A1 describes a method for recovering waste heat of a drive unit of a vehicle, wherein operating states of the drive unit which are predicated on the basis of the route profile of a route section lying ahead of the vehicle on a driving route are taken into account. In this context, prioritization by means of a manual user input and individual user profiles is possible. DE 10 2013 009 913 A1 relates to a method for the predictive control of a cooling device for a drive unit of a vehicle as a function of a route profile of a route section lying ahead of the vehicle on a driving route.

A disadvantage with the previously known approaches and solutions is that complex algorithms have to be developed and also corresponding computer power has to be made available. Furthermore, during the pre-calculation a possible change in the driving route or else in the driving style has to be taken into account by the driver in order to avoid possible overheating of components in the drive train. This leads to a situation in which the full potential of such a system cannot be utilized.

In one example, the issues described above may be addressed by a method for operating a motor vehicle which comprises a drive train, a device for regulating the temperature of the drive train, and a device for determining an optimum temperature of the drive train with respect to the lowest possible consumption, the method comprising selecting and defining at least one peripheral condition for a determination of the optimum temperature of the drive train, wherein the at least one peripheral condition comprises one or more of a driving style, a load of the vehicle, a driving route, intended interruptions along the driving route, anticipates a duration of a journey, and load consumption of electrical systems, inputting of the at least one selected and defined peripheral condition into the device for determining the optimum temperature of the drive train, determining the optimum temperature of the drive train based on at least one selected and defined peripheral condition which has been input, and regulating the temperature of the drive train to the determined optimum temperature.

As one example, the travel parameters may be displayed to the vehicle operator and other vehicle occupants, if any, via an interactive screen of the infotainment system. The vehicle operator may adjust settings of each of the various travel parameters via the screen. For example, the vehicle operator may type in a first destination of their journey and adjust travel parameters associated with travel to the first destination. The vehicle operator may adjust each of the vehicle load and consumption of electrical systems between low to high. Additionally, the vehicle operator may select their predicted driving style as being restrained, average, or sporty, wherein restrained corresponds to a high fuel economy, sporty corresponds to a low fuel economy, and where average is between the two.

The travel parameter may be displayed to the vehicle operator at a vehicle start, wherein the prompt may keep being displayed until the vehicle operator has provided enough information or the journey is concluded. During the journey, if the vehicle operator is to deviate from one of the travel parameters from which the vehicle operator has input for a threshold duration, then the interactive screen may display the deviation to the vehicle operator. This may additionally including displaying a change in fuel economy based on the deviation.

In some embodiments, a method of the present disclosure may include requesting a vehicle occupant to input one or more travel parameters including destination, driving style, and consumption load of electrical devices, predicting the travel parameters the vehicle occupant did not input, and estimating a plurality of drive train temperatures for a journey based on the input and predicted travel parameters. Predicting the travel parameters may be based on one or more of a starting point, time of day, number of vehicle occupants, current engine operating parameters, and previously learned routes and driving styles. Previously learned driving routes and styles may be associated to various vehicle operators known to the vehicle. For example, a couple may own a vehicle, wherein both a first person and a second person of the couple drive the vehicle. The vehicle may learn driving styles, behaviors, destinations traveled, average miles-per-gallon (MPG), and determine other factors associated with each of the first and second persons. For example, the first person may have a sporty driving style, average 13 MPG, and typically travel to work at 7:30 in the morning. The second person may have a restrained and/or conservative driving style, average 24 MPG, and typically travel to a gym at 9:00 in the evening.

At any rate, regardless of the identity of the vehicle operator, the vehicle operator is requested to input one or more travel parameters at a start of the journey. If one of the travel parameters is adjusted during the journey such that a drive train temperature is adjusted, an adjusted fuel economy may be displayed to the driver. If the adjusted fuel economy is a reduced fuel economy, then the displaying may further include displaying tips to the vehicle operator to restore travel parameters to resemble the input travel parameters to increase fuel economy to a previous value.

In some examples, the interactive screen may display default options. A first default option may correspond to one or more travel parameters corresponding with a low fuel economy, a second default option corresponds to one or more travel parameters corresponding with an average fuel economy, wherein the average fuel economy is based on an average fuel economy determined during previous drive cycles, and a third default option correspond to one or more travel parameters corresponding with a high fuel economy. One of the first, second, or third default options may be selected based on the vehicle operator inputting less than all of the displayed travel parameters, wherein a majority of the travel parameters input by the vehicle operator match travel parameters of the selected default option.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
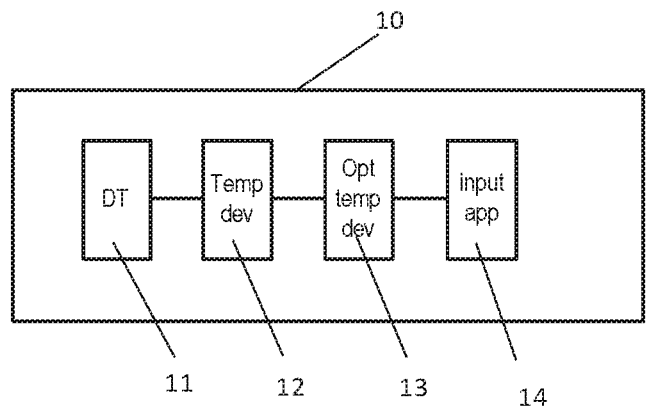
FIG. 1 shows a schematic view of a motor vehicle.

The present disclosure comprises a method for operating a motor vehicle and an advantageous motor vehicle and a storage device, which permit, in particular, demand-based temperature regulation in the drive train with a simplified algorithm and reduced computer power, and therefore permit the user or driver to reduce the consumption or energy demand actively.

The method according to the present disclosure for operating a motor vehicle relates to a motor vehicle which comprises a drive train, a device for regulating the temperature of the drive train, and a device for determining an optimum temperature of the drive train with respect to the lowest possible consumption. The method comprises the following steps: at least one peripheral condition for the determination of the optimum temperature in the drive train is selected and defined by a user of the motor vehicle. The at least one selected and defined peripheral condition is input into the device for determining the optimum temperature of the drive train. The optimum temperature of the drive train is determined taking into account the peripheral conditions which are input. The temperature of the drive train is regulated to the determined optimum temperature.

The user of the motor vehicle can be a vehicle occupant, for example a driver or a co-driver or a front-seat passenger.

Within the scope of the present disclosure, the drive train can comprise an engine. Additionally or alternatively, the drive train may comprise any lubricated component of the vehicle.

The present disclosure provides an active role of the user, in particular of the driver, in the reduction of consumption. The acceptance and readiness of the user to reduce the consumption intentionally are increased by the active influencing capability. This also contributes to reduced emissions of carbon dioxide.

The at least one peripheral condition can characterize, for example, a driving style. In this context, the driving style can be characterized or specified as restrained or sporty or normal. In this example, the user therefore has the possibility of selecting the "driving style" peripheral condition and of specifying one of the variants "sporty", "normal" or "restrained".

Additionally or alternatively to this, the at least one peripheral condition can characterize the load of the vehicle. In this context, the load of the vehicle can be characterized or specified as low or medium or high. In this example the user therefore has the possibility of selecting the "vehicle load" peripheral condition and defining one of the variants "low", "medium" or "high".

Additionally or alternatively to this, the at least one peripheral condition can contain information on the driving route and/or specify intended interruptions in the journey and/or specify the anticipated duration of the journey. Additional information relating to the driving route which is not present in the navigation data or traffic messages can preferably be input as a peripheral condition.

Additionally or alternatively to this, the at least one peripheral condition can specify the use of electrical systems. In this context, the use of electrical systems can be characterized or specified as low or normal or high. In this example, the user therefore has the possibility of selecting the "use of electrical systems" peripheral condition and of defining one of the variants "low", "normal" or "high".

Furthermore, measures can be determined by which the temperature of the drive train can be optimized further. An indication of the determined measures can be output to the user. In this way, the consumption can be reduced further.

Furthermore, at the start of the motor vehicle or during the journey the user can be requested to select and/or set and/or input peripheral conditions. As a result, the peripheral conditions can be adjusted to the respective current state and adapted to the respective situation.

If the user deviates from the selected peripheral conditions, the time period after which the deviation is possible can be determined, in particular as a function of the thermal inertia of the drive train. An indication in this respect can be output to the user.

Furthermore, a saving in consumption which is achieved once and/or over a determined time period can be determined and/or statistically evaluated. The result can be displayed to the user. By means of the evaluation and the display, the user receives direct feedback relating to the effects of inputting of the peripheral conditions. This transparency prompts further consumption-optimizing behavior of the user.

Basically, the selection, definition and inputting of peripheral conditions can be carried out by users, such as vehicle occupants, or a driver. Within the scope of the method it is, however, also possible to make a pre-selection and/or display selection proposals to the user, for example on the basis of existing information relating to the at least one peripheral condition or the peripheral conditions, in particular relating to the vehicle load or to connected electrical devices or to the previous driving style or the like.

The motor vehicle according to the disclosure comprises a drive train, a device for regulating the temperature of the drive train, and a device for determining an optimum temperature of the drive train with respect to the lowest possible consumption. The motor vehicle also comprises an apparatus for inputting at least one peripheral condition and is configured or suitable to carry out a previously described method for operating a motor vehicle. In other words, the motor vehicle is configured for the selection and definition of at least one peripheral condition for the determination of the optimum temperature in the drive train by a user of the motor vehicle, for inputting of the at least one selected and defined peripheral condition into the device, for the determining the optimum temperature of the drive train taking into account the peripheral conditions which have been input, and for regulating the temperature of the drive train to the determined optimum temperature.

The input device is preferably operatively connected to the device for determining the optimum temperature of the drive train. The device for determining the optimum temperature of the drive train is operatively connected to the device for regulating the temperature, and the device for regulating the temperature is operatively connected to the drive train.

The motor vehicle can in principle comprise an internal combustion engine and/or an electric drive, that is to say, for example, also a hybrid drive. The motor vehicle can be a passenger car, a truck or some other motor vehicle.

Data for an application program which, when executed by a processor and/or controller in a motor vehicle, brings about the operation of the motor vehicle according to the method described above is stored on a storage device according to the disclosure. Therefore, in other words, the execution of the described method is made possible and is made available as an application to a motor vehicle user or motor vehicle occupant. In particular, in this way retrofitting of existing systems is possible.

The described present disclosure has overall the advantage that the user or the driver is also included actively in the "predictive thermal management". Through the specification of a number of important peripheral conditions, the algorithm can be simplified and the computing power significantly reduced. The disclosure also has the advantage that the user assumes an active role in conjunction with a specific reduction in consumption in that he is provided with the possibility of specifying in a predictive way the peripheral conditions which are used as the basis for the temperature control of the drive train. In this way, the acceptance of the user with respect to behavior which is economic in terms of fuel is promoted. The fact that the saving in consumption which is specifically brought about by the specification is displayed to the user improves his awareness of matters relating to fuel economy. Overall, the present disclosure reduces the emissions of carbon dioxide, since the consumption is reduced.

Figure 5:
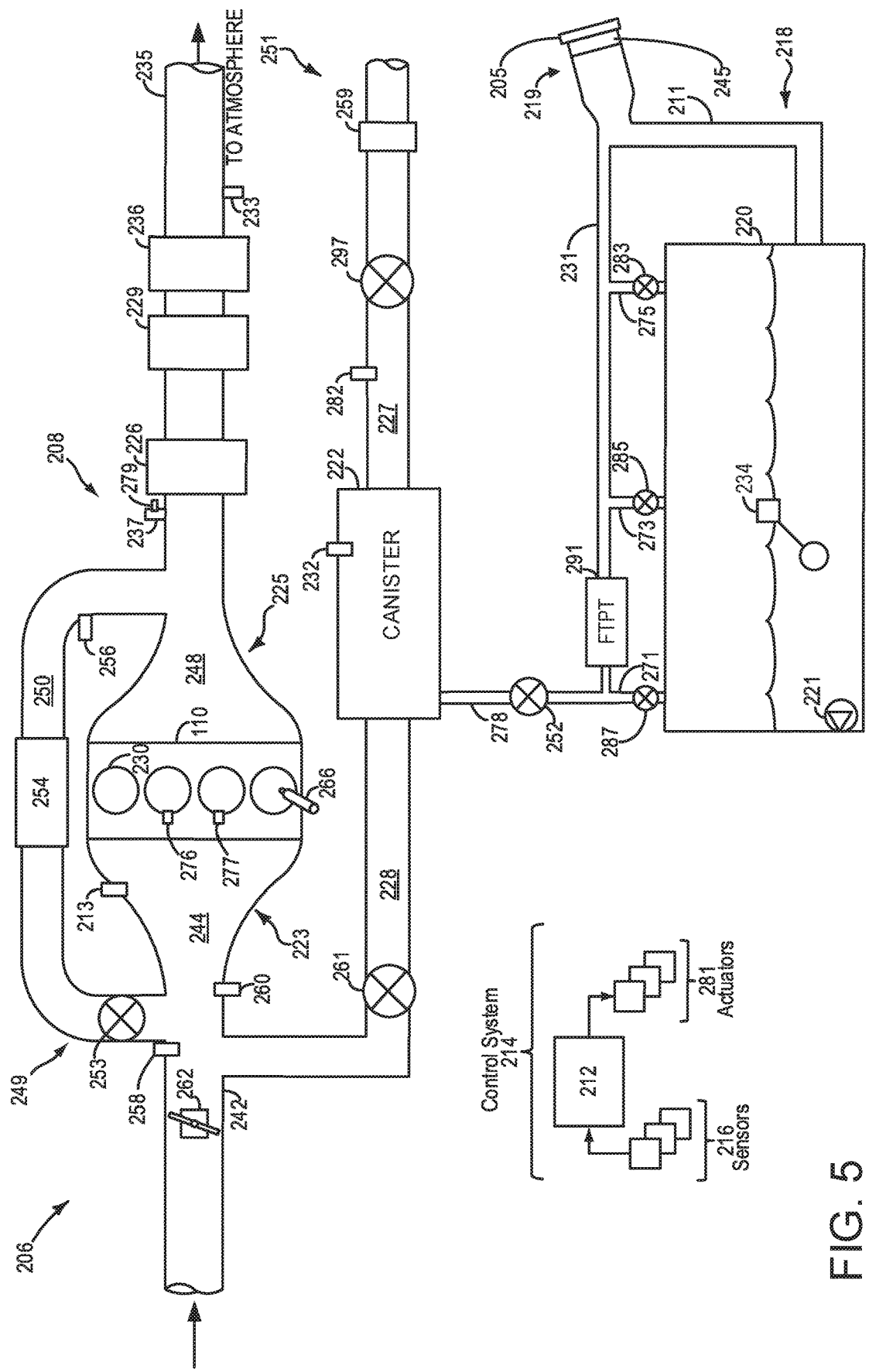
FIG. 5 schematically shows an example vehicle system with a fuel system.

FIGS. 1 and 5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning now to FIG. 1, it shows a vehicle 10 comprising a drive train 11, a device 12 for regulating a temperature of the drive train, and a device 13 for determining an optimum temperature of the drive train with respect to the lowest possible consumption. Said vehicle 10 also comprises an apparatus 14 for inputting at least one peripheral condition and is configured to carry out a method for operating a motor vehicle according to a method already described. In this context, the input apparatus 14 is operatively connected to the device 13 for determining the optimum temperature of the drive train. The device 13 for determining the optimum temperature of the drive train is operatively connected to the device 12 for regulating the temperature, and the device 12 for regulating the temperature is operatively connected to the drive train 11.

The motor vehicle 10 may comprise an internal combustion engine and/or an electric drive, that is to say, for example, also a hybrid drive. The motor vehicle can be a passenger car, a truck or some other motor vehicle.

Figure 2:
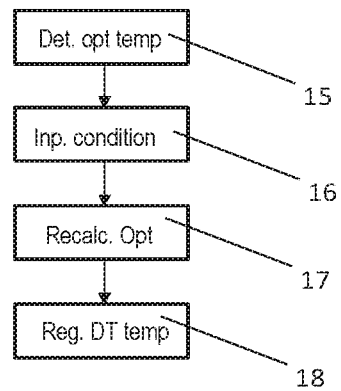
FIG. 2 shows a method for estimating a drive train temperature based on a peripheral condition.

FIG. 2 shows a general example of the method according to the present disclosure in the form of a flowchart. The method comprises the following steps: in step 15 at least one peripheral condition for the determination of the optimum temperature in the drive train is selected and defined by a user of the motor vehicle. Subsequently, in step 16 the at least one selected and defined peripheral condition is input into the device 13 for determining the optimum temperature of the drive train via the input apparatus 14. In step 17, the optimum temperature of the drive train 11 is determined taking into account the peripheral conditions which have been input. The temperature of the drive train 11 is regulated to the determined optimum temperature in step 18.

At the start of the vehicle or even during the journey the user, for example the driver, can be requested to make corresponding inputs, for example to make a selection, in order to define determined peripheral conditions for the "predictive thermal management". These inputs can relate, for example, to the driving style (restrained, normal, sporty), the load of the vehicle (low, medium, high), additional information on the driving route which is not present in the navigation data or traffic messages, intended interruption in the journey, or the anticipated duration of the journey or the use of electrical systems. In addition, the driver can also receive indications that the temperature level can be optimized further by specific measures, which gives rise to a further saving in consumption.

Figure 3:
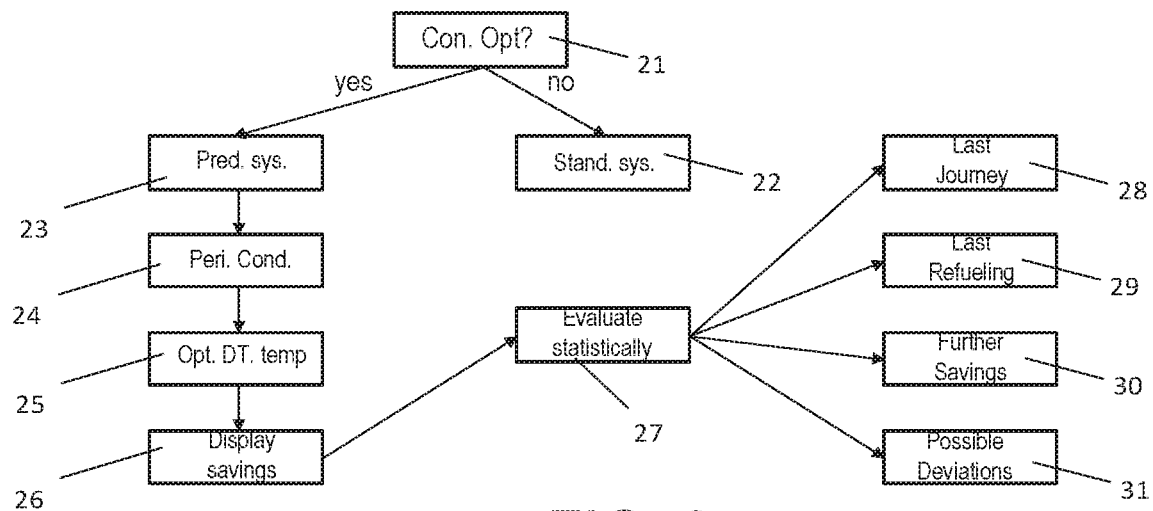
FIG. 3 shows a method for allowing a vehicle occupant to activate a predictive travel parameter program.

FIG. 3 shows a variant of the method of FIG. 2 according to the present disclosure in the form of a flowchart. In a first step 21, the user, for example the driver or another vehicle occupant, can decide whether he would like to utilize an "expanded consumption optimization system". If the response is no, in step 22 the existing standard system or a system for predictive thermal management is utilized.

If the response is yes, in step 23 the predictive thermal management is activated. In step 24, the selection, the definition and inputting of the peripheral conditions take place. Subsequently, in step 25, the temperature level in the drive train is optimized taking into account the peripheral conditions which have been input. For this purpose, taking into account the peripheral conditions which have been input, the optimum temperature of the drive train is determined, for example by means of the device 13 for determining the optimum temperature of the drive train 11, and the temperature of the drive train 11 is regulated to the determined optimum temperature, for example by means of the device 12 for regulating the temperature.

In step 26, the saving in consumption which is achieved by the described method is displayed. The saving in consumption which is determined in this respect can also be evaluated statistically in step 27. In addition, the user can be provided with indications. For this purpose, e.g. in step 28 a display of the saving during the last journey, for example in liters per 100 km, e.g. 0.12 l/100 km, can be displayed. Additionally or alternatively to this, in step 29 a display of the savings since the last refueling process, preferably in liters per 100 km, e.g. 0.15 l/100 km, can be provided. Additionally or alternatively to this, in step 30 a display can be provided which indicates further consumption saving possibilities. A corresponding display can read e.g.: "battery temperature not optimum, a reduction in the electrical consumers can reduce the consumption by 0.1l/km". Additionally or alternatively to this, in step 31 a display can be provided which indicates possibilities for deviating from the peripheral conditions which have been input. A corresponding display can read e.g.: "normal 'driving style' possible 15 seconds after deactivation of 'predictive thermal management'".

A first specific example relates to a 10 km long journey within a town, for example to work. The cold start of the engine occurs at 18° C. The driver activates, or has already previously activated, a system for optimizing consumption, preferably the "expanded consumption optimization system". The system comprises a corresponding device and is configured to execute a described method. The user selects a consumption optimization for the predictive thermal management. Said user selects the peripheral conditions which characterize the driving style, the load, the anticipated duration of the journey, additional information on the driving route and the use of electrical systems and defines the peripheral conditions specifically. The user inputs the following peripheral conditions into a device for determining the optimum temperature of the drive train: driving style "restrained", load "low", anticipated driving duration "20 min", additional information on the driving route "5 min backed up traffic after 6 km", use of electrical systems "normal".

The system then optimizes the temperature level in the drive train in order to reach the lowest possible consumption. For this purpose, taking into account the peripheral conditions which have been input, the optimum temperature of the drive train is determined by means of the device 13 for determining the optimum temperature of the drive train 11, and the temperature of the drive train 11 is regulated to the determined optimum temperature by means of the device 12 for regulating the temperature. If the driver has to deviate from these selected peripheral conditions, the system can inform the driver that this deviation is possible in x seconds, preferably as a function of the thermal inertia of the system. Subsequently, the saving in consumption which has been achieved once can be displayed. Furthermore, the savings in consumption over a relatively long period of time can also be displayed and evaluated statistically, for example during a refueling process.

A second specific example describes a 500 km-long holiday journey. Here, the cold start of the engine occurs at 25° C. The user or driver activates (or has already previously activated) the "expanded consumption optimization system", and selects the consumption optimization "predictive thermal management". The following peripheral conditions are selected, defined and input by the user: driving style "normal", load "high", anticipated driving duration "120 min" until interruption, interruption for 20 min, additional information on the driving route "none", use of electrical systems "high". The system then optimizes the temperature level in the drive train, as described within the scope of the first example, in order to achieve the lowest possible consumption. If the driver has to deviate from these selected peripheral conditions, the system can indicate to the driver that this deviation is possible in x seconds, preferably as a function of the thermal inertia of the system. Subsequently, the saving in consumption which has been achieved once can be displayed. Furthermore, the savings in consumption over a relatively long period of time can also be displayed and evaluated statistically, e.g. at a refueling process.

Figure 4:
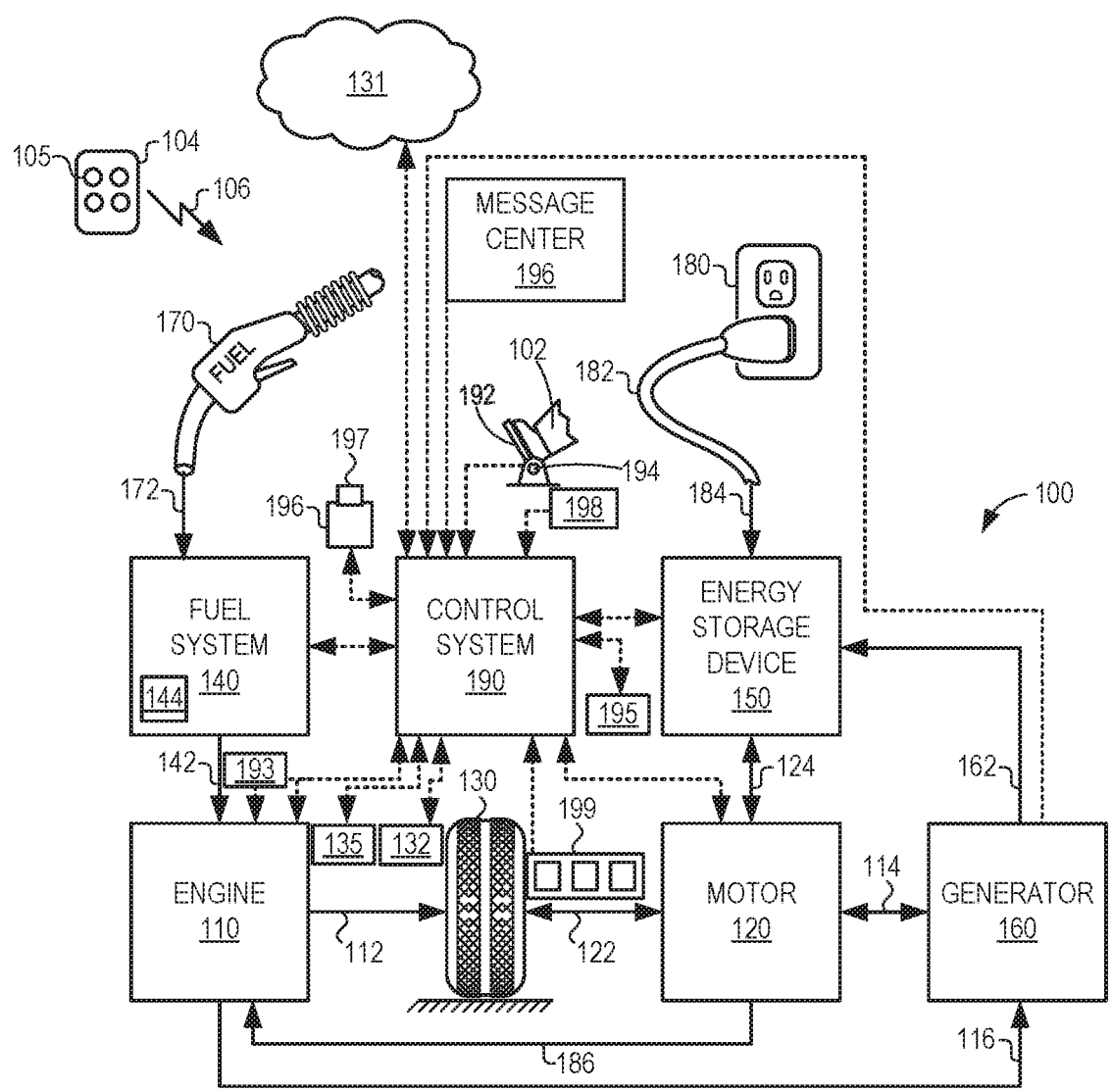
FIG. 4 schematically shows an example vehicle propulsion system.

FIG. 4 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

In another example, the engine may be equipped with a start/stop (S/S) feature 193, wherein the engine 110 may be automatically shut down during times when the vehicle is not moving, or when the vehicle speed is below a threshold speed, when engine speed is below a threshold engine speed, etc. Control system 190 may be connected to engine 110 and S/S feature 193, for performing the start-stop functions. Advantages to the S/S functionality may include an improvement in fuel economy over other vehicles that do not employ such technology.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

In still other examples, which will be discussed in further detail below, motor 120 may be configured to rotate engine unfueled in a forward (e.g. default orientation) or reverse orientation, using energy provided via energy storage device 150, exemplified by arrow 186.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Furthermore, in some examples control system 190 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start the engine.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

Control system 190 may be communicatively coupled to other vehicles or infrastructures using appropriate communications technology, as is known in the art. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 190 may be communicatively coupled to other vehicles or infrastructures via a wireless network 131 and the internet (e.g. cloud), as is commonly known in the art.

Vehicle system 100 may also include an on-board navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, etc.

In some examples, vehicle propulsion system 100 may include one or more onboard cameras 135. Onboard cameras 135 may communicate photos and/or video images to control system 190, for example. Onboard cameras may in some examples be utilized to record images within a predetermined radius of the vehicle, for example.

FIG. 5 shows a schematic depiction of a vehicle system 206. It may be understood that vehicle system 206 may comprise the same vehicle system as vehicle system 100 depicted at FIG. 5. The vehicle system 206 includes an engine system 208 coupled to an emissions control system 251 and a fuel system 218. It may be understood that fuel system 218 may comprise the same fuel system as fuel system 140 depicted at FIG. 4. Emission control system 251 includes a fuel vapor container or canister 222 which may be used to capture and store fuel vapors. The engine system 208 may include an engine 110 having a plurality of cylinders 230. The engine 110 includes an engine air intake system 223 and an engine exhaust system 225. The engine air intake 223 includes a throttle 262 in fluidic communication with engine intake manifold 244 via an intake passage 242. In some examples, throttle 262 may comprise an electronic throttle. Further, engine air intake 223 may include an air box and filter (not shown) positioned upstream of throttle 262. The engine exhaust system 225 includes an exhaust manifold 248 leading to an exhaust passage 235 that routes exhaust gas to the atmosphere. The exhaust passage may lead to one or more exhaust after-treatment devices (e.g. 226, 229, 236).

The exhaust after-treatment devices may be disposed in various orders and/or combinations along exhaust passage 235. For example, a diesel oxidation catalyst (DOC) 226 may be followed downstream by a selective catalytic reduction (SCR) catalyst 229. SCR catalyst 229 may be followed downstream by a diesel particulate filter (DPF) 236. It should be understood that the emissions control devices of the exhaust system 225 shown in FIG. 2 are exemplary in nature. Various other emission control devices and configurations may be included in engine exhaust system 225. For example, exhaust system 225 may include an SCR catalyst followed by a DPF only. In another example, the exhaust system 225 may only include an SCR catalyst. In still another example, a DPF may be located upstream of the SCR catalyst, or a combined DPF/SCR catalyst may be used.

It will be appreciated that other components may be included in the engine such as a variety of valves and sensors. For example, a barometric pressure sensor 213 may be included in the engine intake. In one example, barometric pressure sensor 213 may be a manifold air pressure (MAP) sensor and may be coupled to the engine intake downstream of throttle 262. Barometric pressure sensor 213 may rely on part throttle or full or wide open throttle conditions, e.g., when an opening amount of throttle 262 is greater than a threshold, in order accurately determine BP. In another example, an intake temperature sensor 260 may be positioned in the intake. In yet another example, a humidity sensor 258 may be positioned in the intake.

Engine system 208 may also include an exhaust gas recirculation (EGR) system 249 that receives a portion of an exhaust gas stream exiting engine 110 and returns the exhaust gas to engine intake manifold 244 downstream of throttle 262. Under some conditions, EGR system 249 may be used to regulate the temperature and/or dilution of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing. EGR system 249 is shown forming a common EGR passage 250 from exhaust passage 235 to intake passage 242.

In some examples, exhaust system 225 may also include a turbocharger (not shown) comprising a turbine and a compressor coupled on a common shaft. The turbine may be coupled within exhaust passage 235, while the compressor may be coupled within intake passage 242. Blades of the turbine may be caused to rotate about the common shaft as a portion of the exhaust gas stream discharged from the engine 110 impinges upon the blades of the turbine. The compressor may be coupled to the turbine such that the compressor may be actuated when the blades of the turbine are caused to rotate. When actuated, the compressor may then direct pressurized fresh air to air intake manifold 244 where it may then be directed to engine 110. In systems where EGR passage 250 is coupled to engine exhaust 225 upstream of the turbine and coupled to intake passage 242 downstream of the compressor, the EGR system may be considered a high pressure EGR system. The EGR passage may alternatively be coupled downstream of the turbine and upstream of the compressor (low pressure EGR system).

An EGR valve 253 may be coupled within EGR passage 250. EGR valve 253 may be configured as an active solenoid valve that may be actuated to allow exhaust gas flow into intake manifold 244. The portion of the exhaust gas flow discharged by engine 110 that is allowed to pass through EGR system 249 and return to engine 110 may be metered by the measured actuation of EGR valve 253, which may be regulated by controller 212. The actuation of EGR valve 253 may be based on various vehicle operating parameters and a calculated overall EGR flow rate.

One or more EGR coolers 254 may be coupled within EGR passage 250. EGR cooler 254 may act to lower the overall temperature of the EGR flow stream before passing the stream on to intake manifold 244 where it may be combined with fresh air and directed to engine 110. An EGR sensor 256 may be arranged in EGR passage 250 upstream of the one or more EGR coolers 254.

Fuel system 218 may include a fuel tank 220 coupled to a fuel pump system 221. It may be understood that fuel tank 220 may comprise the same fuel tank as fuel tank 144 depicted above at FIG. 4. The fuel pump system 221 may include one or more pumps for pressurizing fuel delivered to the injectors of engine 110, such as the example injector 266 shown. While only a single injector 266 is shown, additional injectors are provided for each cylinder. Furthermore, in a case where the vehicle system 206 comprises a vehicle that uses diesel fuel, a glowplug 276 may be included for each cylinder 266. The glowplugs 276 may comprise heating devices that may aid in starting diesel engines. Alternatively, in an example where the vehicle system 206 comprises a vehicle that runs on fuel other than diesel, a spark plug 277 may be included for each cylinder 266. It will be appreciated that fuel system 218 may be a return fuel system or various other types of fuel systems. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine air intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves may be positioned in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some examples, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some examples, refueling lock 245 may be a filler pipe valve located at a mouth of fuel filler pipe 211. In such examples, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some examples, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In examples where refueling lock 245 is locked using an electrical mechanism, refueling lock 245 may be unlocked by commands from controller 212, for example, when a fuel tank pressure decreases below a pressure threshold. In examples where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent 286b, the canisters are configured to temporarily trap fuel vapors (including vaporized hydrocarbons) during fuel tank refilling operations and "running loss" (that is, fuel vaporized during vehicle operation). In one example, the adsorbent 286b used is activated charcoal. Emissions control system 251 may further include a canister ventilation path or vent line 227 which may route gases out of the canister 222 to the atmosphere when storing, or trapping, fuel vapors from fuel system 218.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve 297 coupled within vent line 227. When included, the canister vent valve 297 may be a normally open valve, so that fuel tank isolation valve 252 (FTIV) may control venting of fuel tank 220 with the atmosphere. FTIV 252 may be positioned between the fuel tank and the fuel vapor canister 222 within conduit 278. FTIV 252 may be a normally closed valve, that when opened, allows for the venting of fuel vapors from fuel tank 220 to fuel vapor canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. It may be understood that control system 214 may comprise the same control system as control system 190 depicted above at FIG. 4. For example, the fuel system may be operated in a fuel vapor storage mode (e.g., during a fuel tank refueling operation and with the engine not combusting air and fuel), wherein the controller 212 may open isolation valve 252 (when included) while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252 (when included), while maintaining canister purge valve 261 closed, to depressurize the fuel tank before allowing enabling fuel to be added therein. As such, isolation valve 252 (when included) may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine combusting air and fuel), wherein the controller 212 may open canister purge valve 261 while closing isolation valve 252 (when included). Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

Controller 212 may comprise a portion of a control system 214. In some examples, control system 214 may be the same as control system 190, illustrated in FIG. 4. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device 270, temperature sensor 233, temperature sensor 260, pressure sensor 291, pressure sensor 282, and canister temperature sensor 232. Exhaust gas sensor 237 may be a suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Exhaust gas sensor 237 may be connected with controller 212. It may be understood that the exhaust gas sensor 237 may work effectively when heated to approximately 600° F. Accordingly, in some examples the exhaust gas sensor may include heating elements 279, to enable rapid warming of the exhaust gas sensor.

Other sensors such as pressure, temperature, air/fuel ratio, and composition sensors may be coupled to various locations in the vehicle system 206. As another example, the actuators may include throttle 262, fuel tank isolation valve 252, canister purge valve 261, and canister vent valve 297. The control system 214 may include a controller 212. The controller may receive input data from the various sensors, process the input data, and trigger the actuators in response to the processed input data based on instruction or code programmed therein corresponding to one or more routines.

The controller 12 receives signals from the various sensors of FIG. 4 and employs the various actuators of FIG. 4 to adjust engine operation based on the received signals and instructions stored on a memory of the controller. For example, adjusting a display on a navigation system may include signaling to an actuator of the navigation system to change its display to a desired display.

Figure 6A:
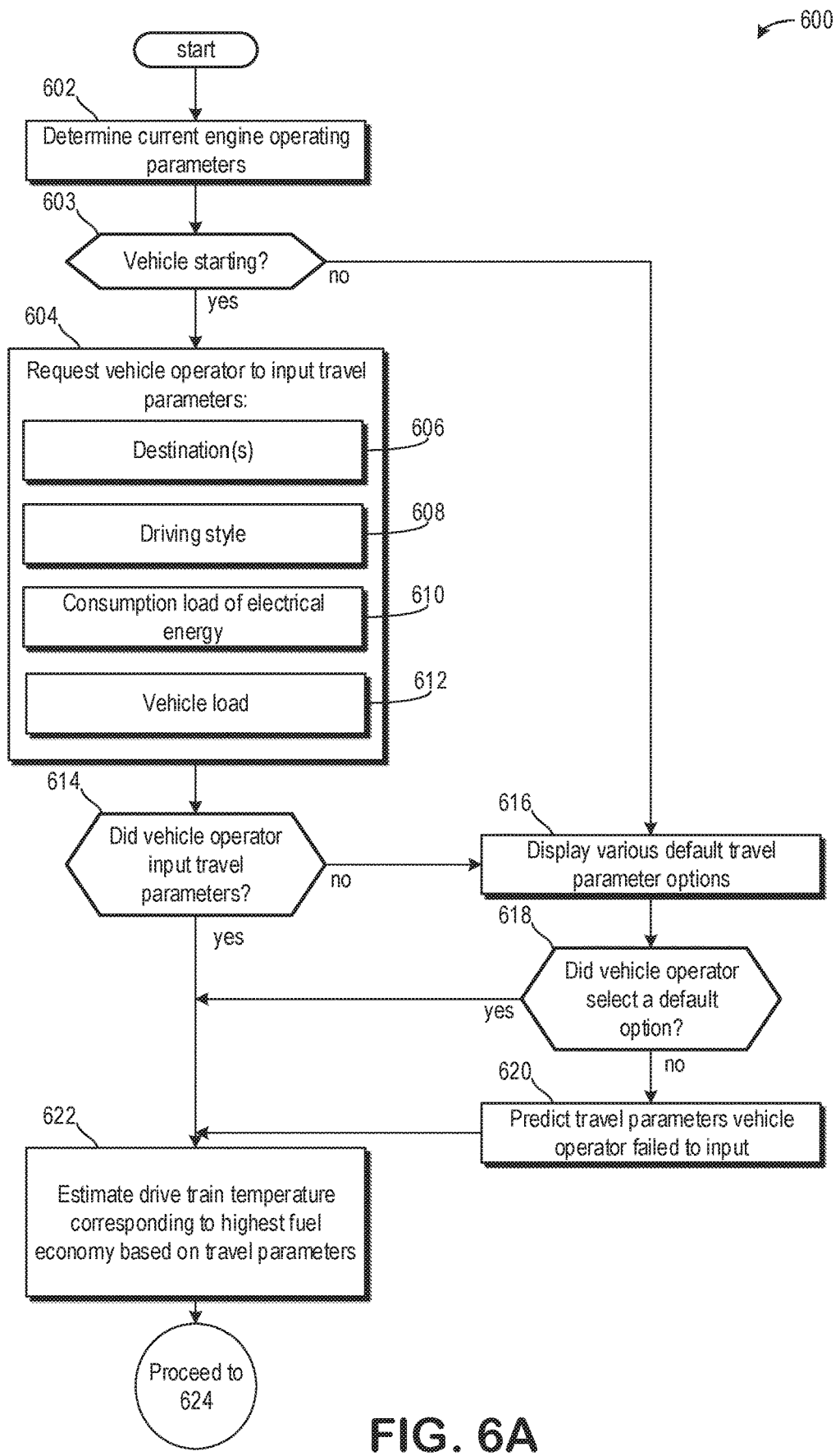
FIGS. 6A and 6B show a method for receiving and/or predicting travel parameter inputs and displaying an estimated fuel economy to vehicle occupants.
Figure 6B:
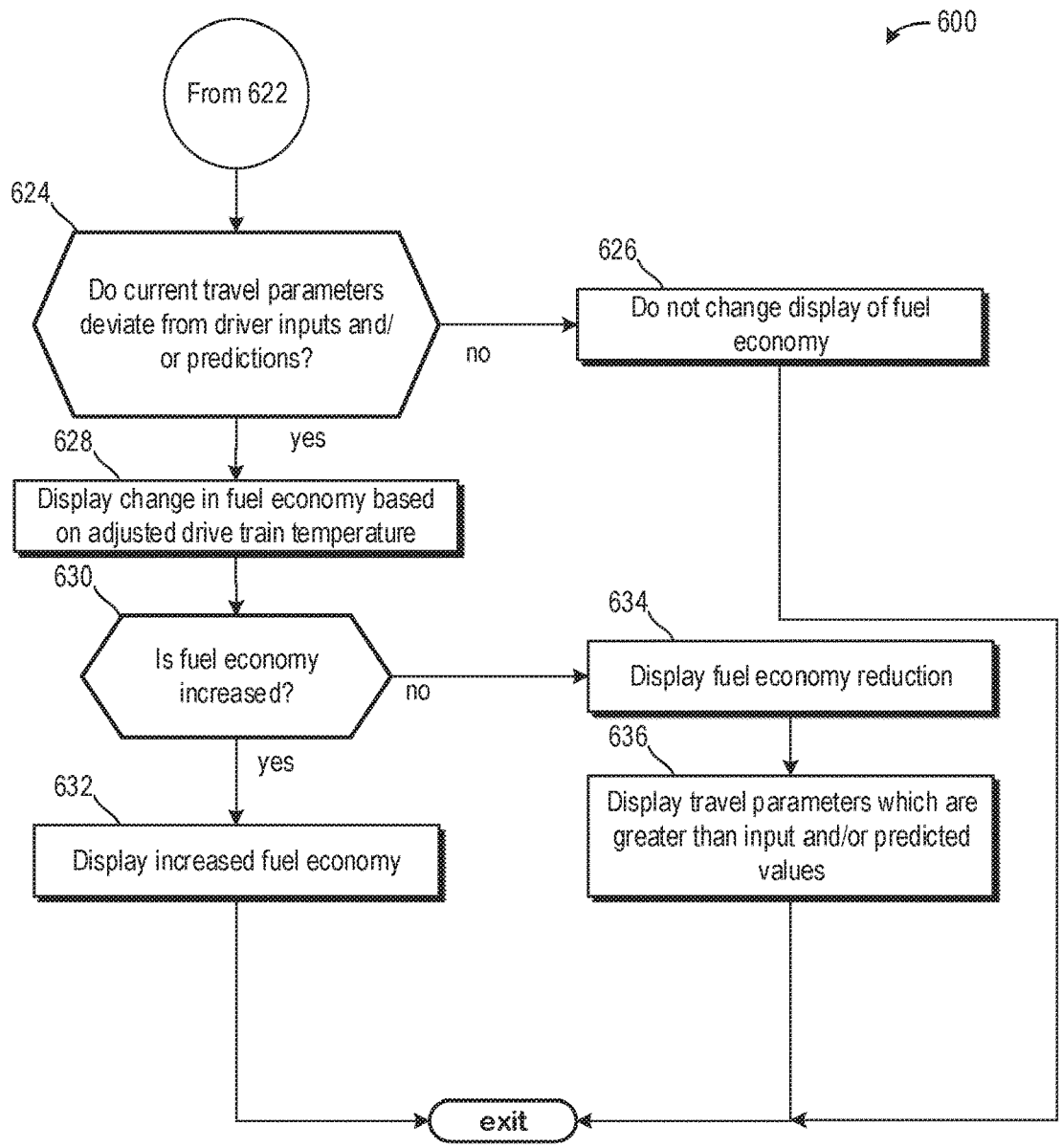

Turning now to FIGS. 6A and 6B, it shows a method 600 for estimating a desired engine temperature based on current travel parameters. Instructions for carrying out method 600 and the methods of FIGS. 2 and 3 included above may be executed by a controller based on instructions stored on a memory of the controller and in conjunction with signals received from sensors of the engine system, such as the sensors described above with reference to FIG. 4. The controller may employ engine actuators of the engine system to adjust engine operation, according to the methods described below.

The method 600 begins at 602, which includes determining current engine operating parameters. Current engine operating parameters may include, but are not limited to, one or more of engine temperature, engine speed, ambient temperature, ambient humidity, manifold vacuum, EGR flow rate, and air/fuel ratio. Additionally or alternatively, the method may further determine a time of day, location, number of vehicle occupants, and the like. A location may be determined via a vehicle navigation system and/or information relayed from a smart device of a vehicle operator, wherein the smart device may be in communication with a controller of the vehicle via a cable, WiFi, Bluetooth, and the like.

The method 600 may proceed to 603, which may include determining if a vehicle is starting. The vehicle may be starting if one or more of the following conditions is met, including the vehicle operator depressing an engine start button, a remote start button being depressed, an ignition key being actuated in an ignition key slot, the vehicle operator entering the vehicle, a parking brake being currently selected, and the vehicle being stationary.

If the vehicle is starting, then the method 600 may proceed to 604, which includes requesting the vehicle operator to input one or more travel parameters. Travel parameters may refer to parameters that may occur on a current driving route. As an example, if the vehicle operator plans on travelling from location A, to location B, then to location C, and back to location A, then the travel parameters may include traffic, weather, vehicle occupants, stops, driver behavior, and the like through the entire journey.

Travel parameters presented to the driver may include destination(s) at 606, driving style (e.g., sporty, average, and conservative) at 608, consumption load of electrical energy (e.g., low, average, and high) at 610, and vehicle load (e.g., low, mid, high) at 612. Each of the parameters may be displayed on an infotainment system screen of the vehicle.

Additionally or alternatively, the prompts may be displayed on a smart device belonging to the vehicle operator or to some other vehicle occupant. The vehicle operator or vehicle occupants may adjust each of the travel parameters via a slider, turn dial, increase/decrease buttons, and/or via a manual input. Consumption load of electrical energy may be based on music volume, mobile devices connected to the vehicle, display brightness of the infotainment screen, air conditioning, and the like.

As an example, if the vehicle operator expects to travel from location A, to location B, and back to location A, then the vehicle operator may input travel parameters for driving to location B from location A and for driving to location A from location B. Furthermore, the vehicle operator may predict adjusting their driving style or consumption load of electrical energy after reaching location B. For example, if location B is a school, where the vehicle operator intends to pick up their children, the vehicle operator may select a sporty driving style with low consumption load of electrical energy when traveling from location A to location B. The vehicle operator may then predict a conservative driving style with high consumption load of electrical energy when traveling from location B back to location A. The vehicle operator may predict increased consumption load of electrical energy due to charging of mobile devices, music being played, vehicle media devices being watched/used, and dual climate control use.

The method 600 may proceed to 614, which may include determining if the vehicle operator input travel parameters. This may include determining if the vehicle operator at least one of the travel parameters. In one example, the determining includes determining if at least one destination was input. Additionally or alternatively, the determining includes if the driver input each of the travel parameters.

If the vehicle operator did not input each of the travel parameters, then the method 600 may proceed to 616, which may include displaying various default travel parameters options. For example, the default travel parameters options may include high consumption, average, or low consumption. Average consumption may correspond to an average fuel consumption calculated for the vehicle operator based on their previous driving behavior, destinations traveled, and the like. Furthermore, the average consumption may be associated with a specific time of day. For example, if the vehicle operator selects average at 8:00 in the morning on a Tuesday, then the method may predict that the vehicle operator will travel from home to school with a conservative driving style, where their children may be dropped off. After school, the driving style may switch to a sporty driving style (e.g., faster vehicle speeds, harder tip-ins, late braking, higher engine RPM prior to a gear change, etc.) as the vehicle operator travels from school to work. Thus, each of home, school, and work are previously traveled destinations learned by the vehicle and saved in accessible memory thereof.

As another example, if the vehicle operator selects average at 8:00 in the morning on a Tuesday, the method may account for a number of vehicle occupants. If only the vehicle operator is present, then the method may determine that the vehicle operator is traveling from home to work without stopping at school as an example.

At any rate, the method 600 may proceed to 618, which may include determining if the vehicle operator selected a default option. If the vehicle operator did not select a default option, then the method 600 may proceed to 620 to predict travel parameters the vehicle operator failed to input. As an example, if the vehicle operator failed to input all of the travel parameters, then the travel parameters may be predicted based on a time of day, number of vehicle occupants, and starting location. For example, if it is 8:00 in the morning, and three occupants enter the vehicle, then the method may further account for a weight of each of the occupants to determine an age and/or identity. Additionally, previous travel destination sequences from the current starting location at 8:00 in the morning may be analyzed to more accurately predict the route to be driven.

Additionally or alternatively, weather may be used to predict consumption load of electrical energy. For example, if it is 2° C. outside and two vehicle occupants are present, a prediction may include mid consumption load of electrical energy due to defrost, seat warmers, and dual climate control being activated. The mid consumption load may be increased to a high consumption load in response to more vehicle occupants entering the vehicle, wherein a rear of the vehicle (e.g., area of the vehicle cabin adjacent the rear seats) may also be heated and climate controlled.

In some embodiments, the method may request the vehicle operator to input travel parameters at a vehicle stop (e.g., stop light, next destination, etc.).

Following 620, or following affirmative (yes) at 614 or 618, the method 600 may proceed to 622 which may include estimating a drive train temperature corresponding to a highest fuel economy based on the travel parameters. That is to say, the drive train temperature may be optimized for each portion of the route to increase fuel economy.

As an example, if the vehicle operator selected sporty, which may correspond to a relatively low fuel economy compared to a conservative driving behavior, the method may estimate locations along the driving route wherein fuel economy may be increased. For example, the method may anticipate a stop at a traffic light in 13 minutes due to upcoming traffic congestion. In light of the prediction, engine operating parameters may be adjusted (e.g., decrease fuel injection volume boost) to increase fuel economy while still meeting driver demand. As an example, adjusting engine operating parameters to adjust the drivetrain temperature to meet a desired fuel economy may include adjusting one or more of a fuel injection volume, fuel injection pressure, boost, EGR flow rate, and spark timing. For example, if the drive train temperature is greater than the estimated drive train temperature, then the controller may signal to one or more actuators to decrease the fuel injection, decrease the fuel injection pressure, decrease boost, increase EGR flow rate, and advance spark timing. Alternatively, if the drive train temperature is less than the estimated drive train temperature, then the controller may signal to one or more actuators to increase the fuel injection, increase the fuel injection pressure, increase boost, decrease the EGR flow rate, and retard spark timing. This may be accomplished based on feedback from one or more of the navigation system, GPS device, vehicle operator cellular device, street cameras, and other vehicles. For example, other vehicles may communicate with the controller of the vehicle of the vehicle operator, where the other vehicle may relay traffic information, route traveled, and the like.

As an example, if a vehicle journey comprises a first portion and a second portion, where the second portion occurs directly after the first portion later in the journey, then each of the first portion and the second portion may comprise a first estimated drive train temperature and a second estimated drive train temperature, respectively. A difference between the first and second drive train temperature may result in different engine operating parameters adjustments. For example, if the first estimated drive train temperature is less than the second estimated drive train temperature, then engine operating parameters may be adjusted to increase drive train temperatures. The controller may signal to one or more actuators to adjust one or more of the fuel injection volume to increase, fuel injection pressure to increase, boost to increase, EGR flow rate to decrease, and spark timing to be retarded. By doing this, the first estimated drive train temperature may be increased to substantially match the second estimated drive train temperature.

The method 600 may proceed to 624, which may include determining if current travel parameters differ from driver input and/or predicted travel parameters. For example, if the vehicle operator selected a conservative driving behavior, but the current travel parameters sense a sporty driving behavior, then a deviation has occurred. Additionally, in some examples, if a destination was predicted (e.g., work), but the route changed such that the predicted destination is no longer the likeliest destination, then a deviation has occurred. If a deviation has not occurred, then the method 600 may proceed to 626, which includes not adjusting a displayed fuel economy. As such, the estimated engine temperature(s) may be utilized.

If a deviation has occurred, then the method 600 may proceed to 628, which may include displaying a change in fuel economy based on an adjusted estimated drive train temperature. The adjusted estimated drive train temperature may be adjusted based on the deviation in travel parameters.

The method 600 may proceed to 630, where the method includes determining if fuel economy has increased due to the deviation. If fuel economy has increased (e.g., the deviation includes a switch from a sporting driving style to a conservative driving style), then the method 600 may proceed to 632, which may include displaying the increased fuel economy. Additionally or alternatively, displaying may further include the changed vehicle parameters resulting in the increased fuel economy (e.g., deactivation of dual climate control).

If fuel economy has decreased, then the method 600 may proceed to 634 to display the fuel economy reduction. The method 600 may proceed to 636, which may include displaying the deviated travel parameters resulting in the reduction in fuel economy. Additionally or alternatively, the displaying may include displaying tips to adjust driving style, decrease consumption load of electrical energy, and the like.

In some embodiments, additionally or alternatively, fuel economies of vehicles travelling on a same road may be displayed to one another. For example, the fuel economy of a nearby vehicle may be displayed on an infotainment screen of a different, nearby vehicle, and vice versa, so that vehicle operators may compare fuel economies. This may present a form of competition and/or motivation to vehicle operators, thereby adjusting their driving habits to improve their fuel economy.

In this way, a vehicle operator may input information about their intended driving style, destination, electrical energy consumption, and the like to allow the vehicle to estimate engine temperatures. The technical effect of requesting and/or predicting various travel parameters is to optimize engine temperatures at various portions of the route to increase fuel economy. Additionally, tips and/or instructions may be displayed to the vehicle operator to promote driving habits geared toward increased fuel economy. Furthermore, fuel economy from other vehicles may be displayed to the vehicle operator to further promote driving habits associated with increased fuel economy.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
requesting a user to input a plurality of travel parameters and receiving an input including at least one destination, a driving style, and a consumption load of electrical energy for the plurality of travel parameters, wherein the consumption load of electrical energy is based on one or more of a number of mobile devices connected to a vehicle, air conditioning, vehicle media devices used, dual climate control use, seat warmers, and a number of vehicle occupants;
predicting the plurality of travel parameters the user did not input based on one or more of a starting location, time of day, the number of vehicle occupants, current engine operating parameters, weather, and previously learned routes and driving styles, wherein as a prediction of the number of vehicle occupants increases, a prediction of a consumption of electric energy also increases, and wherein the driving style is used to predict a fuel economy, and wherein the fuel economy decreases in response to the driving style being sporty; and estimating a plurality of drive train temperatures of a drive train for a journey based on the input and predicted travel parameters, wherein the journey comprises one or more portions, and where each of the estimated plurality of drive train temperatures corresponds to the plurality of travel parameters during different portions of the journey, wherein the drive train includes an engine of the vehicle;

determining that a drive train temperature of the drive train at a portion of the one or more portions of the journey differs from a corresponding estimated drive train temperature for the portion of the journey based on the plurality of drive train temperatures estimated for the one or more portions of the journey; and responsive to determining that the drive train temperature and the corresponding estimated drive train temperature differ, adjusting engine operation of the vehicle to adjust the drive train temperature closer to the corresponding estimated drive train temperature, where adjusting the engine operation includes adjusting one or more actuators of the engine of the vehicle.

2. The method of claim 1, further comprising adjusting an estimate of the plurality of drive train temperatures in response to a user input resulting in a decrease in an estimated fuel economy, further comprising displaying the estimated fuel economy and tips to the user to increase the estimated fuel economy.

3. The method of claim 1, wherein the journey comprises one or more portions including a starting location, a location A, and a location B, and where the estimated plurality of drive train temperatures includes a first drivetrain temperature for a first portion of the journey from the starting location to the location A and a second drivetrain temperature for a second portion of the journey from location A to location B.

4. The method of claim 1, wherein the requesting further comprises displaying default options wherein a first default option corresponds to one or more travel parameters corresponding with a low fuel economy which includes a sporty driving style including faster vehicle speeds, late braking, and higher engine RPM prior to gear change, a second default option corresponds to one or more travel parameters corresponding with an average fuel economy, wherein the average fuel economy is based on a fuel economy determined during previous user drive cycles, and a third default option corresponds to one or more travel parameters corresponding with a high fuel economy which includes a conservative driving style including slower vehicle speeds, and lower engine RPM, wherein the average fuel economy includes an average driving style of the sporty driving style and the conservative driving style.

5. The method of claim 4, wherein one of the first, second, or third default options is selected based on the user inputting at least one of the travel parameters.

6. The method of claim 1, wherein adjusting the one or more actuators of the engine of the vehicle includes adjusting fuel actuators of the engine.

7. The method of claim 1, wherein adjusting the one or more actuators of the engine of the vehicle includes adjusting actuation of a spark plug of the engine.

8. The method of claim 1, wherein the plurality of drive train temperatures estimated for the drive train are drive train temperatures corresponding to a highest fuel economy.

* * * * *